Patented Apr. 30, 1940

2,198,991

UNITED STATES PATENT OFFICE 2,198,991

WAX EMULSION COMPOSITION

Walter C. Dutton, East Lansing, Mich., assignor to The Dow Chemical Company, Midland, Mich., a corporation of Michigan No Drawing. Application April 9, 1938, Serial No. 201,183

4 Claims. (Cl. 47—58)

This invention relates to wax emulsion compositions and to a method for protecting growing trees and shrubs against sunscald injury and resultant susceptibility to borer and fungous attack.

Trees and shrubs may be seriously injured by prolonged exposure to direct sunlight. The primary result of such injury consists in the killing of the bark, which sometimes loosens and sloughs off of the trunk and larger limbs of the affected tree. Different phases of such injury are variously known as scald, sunscald, winter sunscald, crown-rot, collar-rot, frost-canker, frost injury and winter injury. The expression "sunscald" as employed in the following specification and claims includes each of the above terms.

Among the commoner forms of scald injury is that resulting from the desiccation of small trees and particularly transplants in summer, and is evidenced by the death of the bark and sometimes by the opening of cracks and fissures on the trunk and larger branches of the tree. This injury generally occurs on the sun-exposed side of the tree and is caused by the raising of the temperature of the tree surfaces on prolonged contact with sunlight to a point appreciably above the temperature of the surrounding air. The result of such localized over-heating is that the rate of evaporation and moisture loss at the exposed surfaces is appreciably accelerated. Sunscald injury may result in the stunting of the tree or its destruction.

Winter sunscald, collar-rot, crown-rot, and the like, frequently result from sudden changes of temperature during the winter. The trunks and branches of deciduous trees may be exposed to gradually decreasing temperatures and maintained in a frozen condition throughout the winter, and upon thawing be found substantially unharmed. However, when such frozen trunk and branches or portions thereof are exposed to thawing temperatures and thereafter rapidly cooled and re-frozen, the bark may be killed, so that appreciable tree injury results. This damage may not become apparent until warmer weather, at which time there is a tendency for such repeatedly frozen surfaces to slough off their bark and expose the discolored sapwood beneath. Sun-exposed portions of a tree are most susceptible to this injury. Explanation for this effect lies in the fact that the rays of the sun beating upon the exposed tree surfaces commonly raise the temperature thereof by from 9° to 15° F. above the air temperature. This increase in surface temperature frequently results in the partial thawing of the exposed tree surfaces. Upon the withdrawal of the sun's rays, the temperature of the sun-exposed area may fall so quickly to below freezing as to remove water rapidly from the tree tissue and cells, causing necrosis of the affected surfaces. The bark and woody tissue on unexposed areas, subject to more gradual temperature changes, are seldom injured.

Plants, and particularly small trees and shrubs, are frequently packed with straw, leaves, or refuse, or wrapped with paper or cloth to prevent sunscald by providing insulation against both cold and the sun's rays. While such procedure reduces plant injury, it is relatively expensive, and the unsightly tree wrappings or packing give protection and a convenient breeding place for common tree parasites. Various wax emulsion compositions have been applied to tree surfaces to reduce the rate of desiccation thereof, but all of them, of which I am aware, produce films which neither shield the bark surfaces from sunlight nor eliminate sunscald.

The tree injury described above is in itself detrimental to the well-being of the tree, but the subsequent infestation of the dead bark and woody tissue by tree borers, fungi and bacteria is probably of greater consequence. The dead and injured bark of trees suffering from sunscald provides a spot at which the tree is vulnerable to attack by borers, the larvae of which do not generally thrive in healthy bark and wood. Furthermore, the sap and gums exuding from cracks and abrasions in and on the trunk surfaces provide optimum media for the growth of bacteria, fungi, etc. Parasitic and saprophytic fungi and bacteria infect the damaged tree surfaces, frequently rotting portions of the trunk and so weakening the tree that it is easily broken over by wind storms. The uncontrolled attack by borer insects, bacteria, and fungi eventually destroys sunscalded trees.

Common methods for controlling the infestation of insects and micro-organisms in dead bark and sunscald fissures and scars consist of spraying the trees with various insecticidal and fungicidal materials, and in the removal of badly infected and infested portions of the tree. Sprays and other control methods do not, however, provide control for infestation in and under the bark of the tree and cannot undo the physical injury caused by sunscald.

I have discovered that scald injury directly attributable to the effects of the sun's rays may be prevented by coating the trunk and branches of the subject tree with an aqueous wax emulsion comprising finely divided aluminum. The resulting opaque film is adapted to exclude and reflect sunlight and thereby appreciably lowers the temperature of the coated surfaces.

The treating composition may be prepared by incorporating finely divided aluminum with any aqueous wax emulsion, provided only that such emulsion is not itself harmful to growing plants, is adapted to form on the tree surfaces an adherent and tough film, and does not contain ingredients which react with the aluminum. An emulsion particularly well adapted to serve as a carrier for the aluminum is that described in United States Patent No. 2,013,063, to Elroy J. Miller. The application of a dilute suspension of this composition produces a film which reduces the rate at which plants and trees lose moisture during hot weather, and is semi-permeable. I have found that the incorporation of finely divided aluminum with this emulsion not only imparts to a film thereof the ability to prevent sunscald injury, but also appreciably extends the life of the film, which shows an increased resistance to weathering and to dissipation on exposure to summer temperatures.

The above emulsion material comprises a wax, an ammonium salt of an acid of a drying oil, and a colloidal earth. Any suitable wax, such as paraffin wax, beeswax, Carnauba wax, and the like, can be employed. As an emulsifier, various ammonium salts of unsaturated fatty acids, having two or more double bonds in their chemical formula, such as those derived from such common drying oils as linseed, sardine, perilla, tung, soy bean, fish, etc., can be used. Bentonite, fuller's earth, and similar diatomaceous clays are incorporated in such emulsions to serve as a support for the wax and to prevent tissue injury by rendering the film semi-permeable, whereby carbon dioxide and other vaporous products of plant metabolism are permitted to pass through the film. Various insecticides, fungicides, germicides, or preservatives can be incorporated in the composition, if desired.

One method by which a representative composition, falling within the scope of my invention, can be prepared is as follows: A suspension of colloidal earth in hot water is mixed with a hot aqueous dispersion of an ammonium salt of a drying oil acid. The wax is melted and added to the hot aqueous mixture, which is then stirred at a temperature well above the melting point of the wax until the desired degree of dispersion is accomplished. The finely divided aluminum may then be added to the composition which is thereafter thoroughly mixed and gradually cooled to a temperature below the melting point of the wax. If desired, the finely divided aluminum may be incorporated with a finished emulsion product as, for example, by partially diluting the above composition with water and stirring the aluminum into the resulting suspension.

I generally employ from 2 to 10 per cent by weight of aluminum in the diluted coating composition. While aluminum dust may be employed in the mixture, it has been found that aluminum flake powder is to be preferred, where a uniformly opaque and light-impervious film of maximum reflecting power is desired.

The following example is illustrative of one way in which my new composition may be prepared and applied to growing trees, but is not to be construed as limiting the invention:

*Example*

3 parts by weight of ammonium linoleate was dissolved in 50 parts of hot water. 3 parts of bentonite was worked into a smooth dispersion with 50 parts of water and mixed with the above solution at temperatures between 70° and 90° C. 10 parts by weight of molten paraffin wax was slowly poured into the hot mixture and the resulting slurry vigorously stirred until a good emulsion was obtained. Stirring was continued and the hot mixture gradually cooled to a temperature below the melting point of the wax, whereby there was obtained a stock emulsion as a white, creamy material having an ammoniacal odor, and adapted to form a relatively stable suspension upon dilution with water.

Two spray materials were prepared from the above composition. The first of these was a control emulsion and consisted of an intimate mixture of 36 parts by weight of the stock emulsion with 80 parts by weight of water. The second spray composition was prepared by diluting 36 parts by weight of the stock emulsion with an equal weight of water, intimately incorporating 7.2 parts of finely divided aluminum flake powder therewith, and thereafter mixing the slurry with an additional 44 parts of water to form a relatively homogeneous composition in which the aluminum flakes were suspended and supported on the finely dispersed bentonite and wax particles. A number of tests were carried out to ascertain the comparative effectiveness of the above compositions with respect to their ability to prevent sunscald injury, and the permanence of films deposited upon tree surfaces.

In a representative application, the above compositions were applied during the early spring to the trunk and larger branches of a number of cut-leaf maple transplants, varying in size from 2 to 3 inches in diameter. Each of the trees was first sprayed with a priming coat of the control emulsion described above. Certain of the test trees were thereafter sprayed with the emulsion containing the aluminum powder, those trees not so sprayed receiving an additional coat of the control emulsion composition. The trees in the test plot were then observed over a nine-months period, during which time the temperature ranged between −15° and 105° F. All of the trees survived the test period. A relatively uniform film remained on the tree surfaces sprayed with the composition containing the aluminum powder. Little evidence of residual film was observed on these trees sprayed only with the control emulsion.

The tree surfaces protected by the aluminum containing film were found to be free from sunscald type injury and showed no evidence of borer and fungous attack. The bark of certain trees similarly treated with the control emulsion was found to have undergone sunscald injury and to have been attacked by both borer larvae and fungus.

I claim:
1. A method for protecting living trees from sunscald and resultant vulnerability to borer and fungous attack, which comprises applying an aqueous wax emulsion containing finely divided aluminum to the trunk and branches of the tree, whereby an opaque film is formed thereon adapted to exclude and reflect light.

2. A method for protecting living trees from sunscald and resultant vulnerability to borer and fungous attack, which comprises forming an opaque film adapted to exclude and reflect light on the trunk and branch surfaces of the tree by the application thereto of an aqueous wax emulsion comprising aluminum flake powder.

3. A method for protecting living trees from sunscald and subsequent susceptibility to borer and fungous attack, which consists in treating the trunk and branches of the tree with an aqueous emulsion comprising paraffin wax, a colloidal earth, and finely divided aluminum.

4. In a method for protecting living trees from sunscald, borer, and fugous injury, the step which consists in treating the trunk and branches of the tree with an aqueous emulsion comprising a paraffin wax, an ammonium salt of a drying oil acid, a colloidal earth, and finely divided aluminum.

WALTER C. DUTTON.